United States Patent Office 2,940,126
Patented June 14, 1960

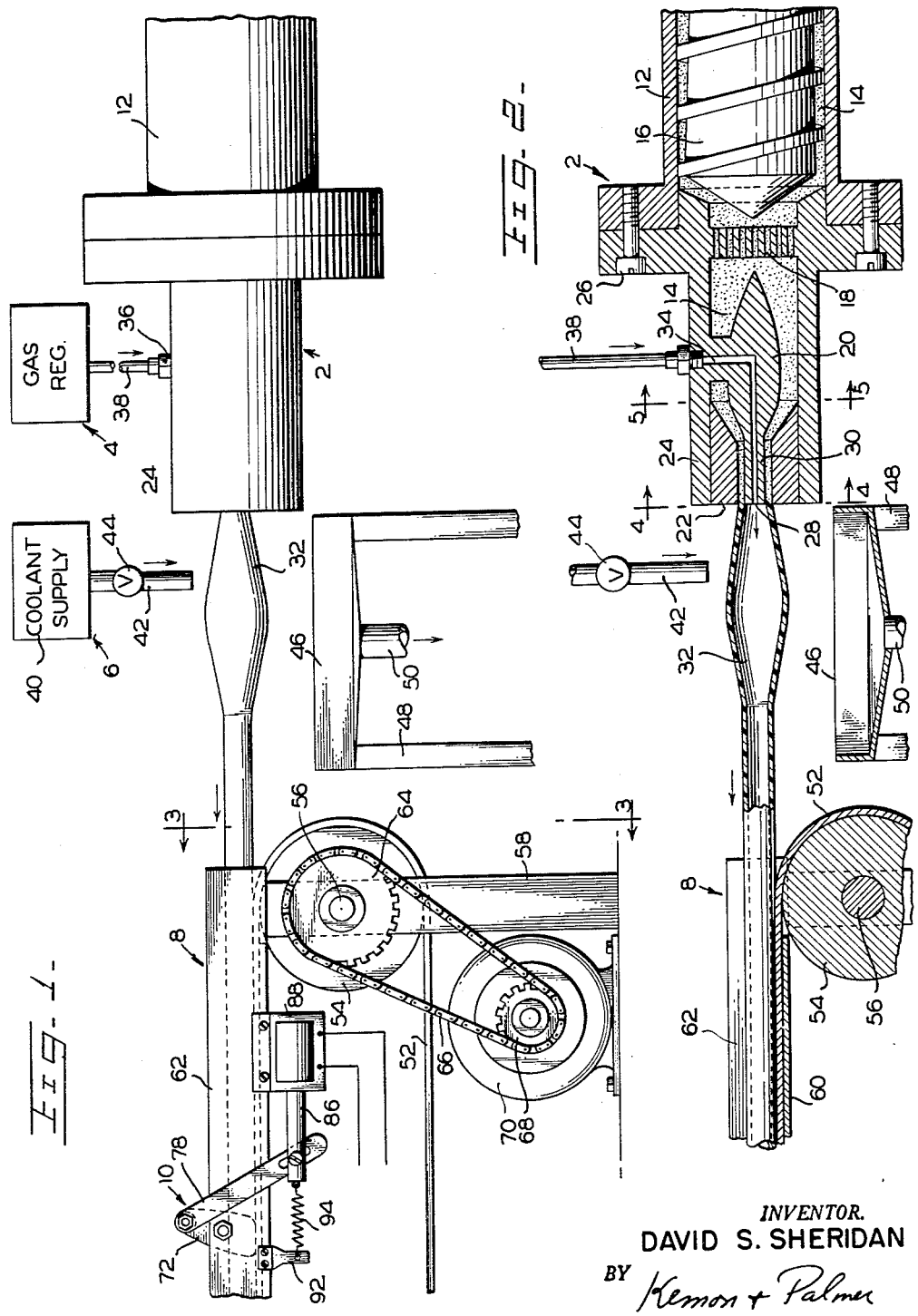

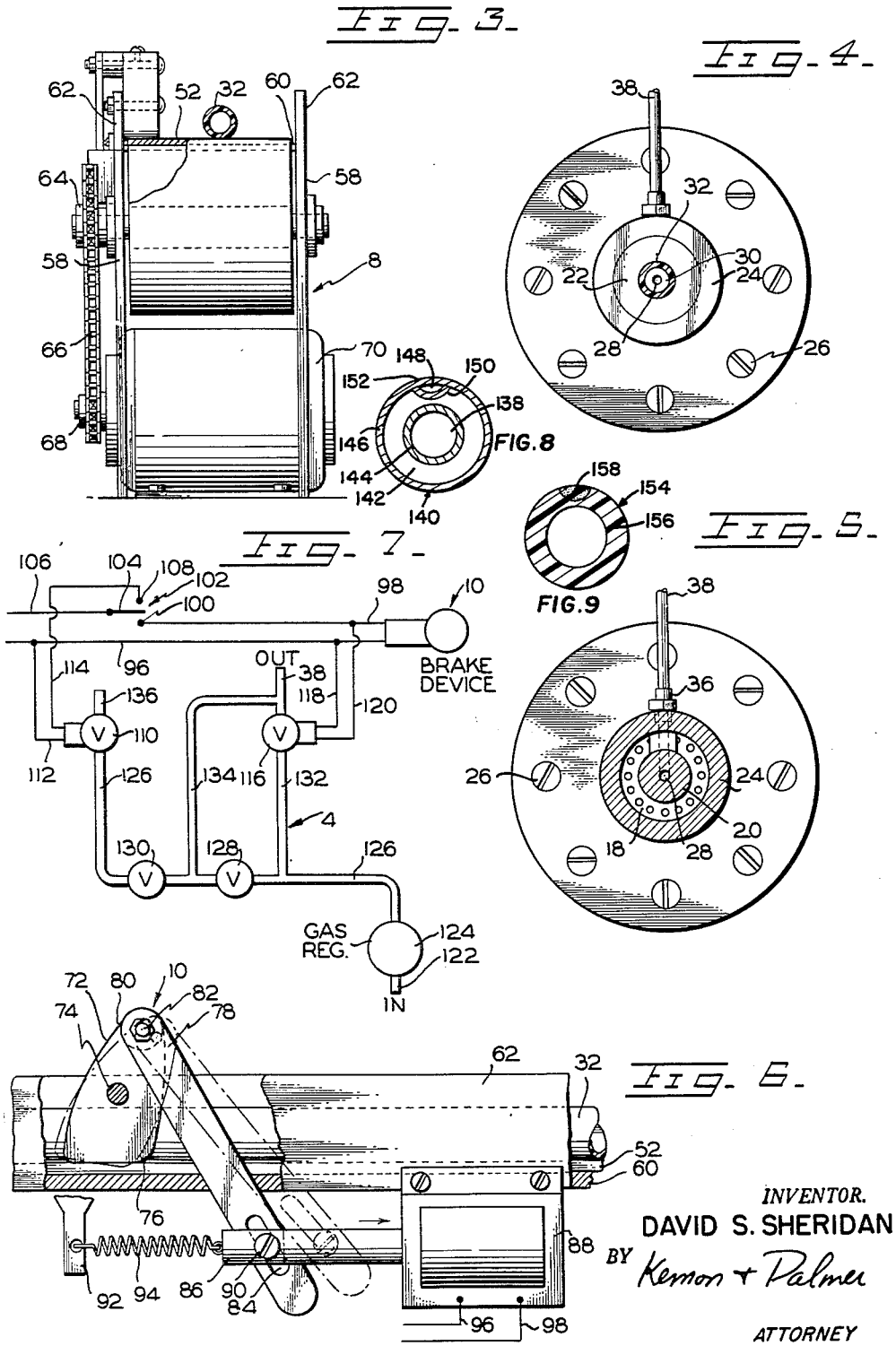

2,940,126

PRODUCTION OF TAPERED MEDICO-SURGICAL TUBES WHICH HAVE CONTROLLED WALL THICKNESS BY EXTRUSION

David S. Sheridan, P.O. Box 147, Argyle, N.Y.

Filed June 3, 1958, Ser. No. 739,628

6 Claims. (Cl. 18—55)

This invention relates to the production of tapered, medico-surgical tubes by extrusion of flexible, waterproof plastic material. More particularly, it is concerned with the production of tapered catheters and similar tubes used for conveying fluids to and from living tissue in conjunction with the medical or surgical treatment of the tissue, the tapered catheters and other tubes so produced having controlled wall thickness as well as tapered sections.

This application is a continuation-in-part of copending applications S.N. 580,832, filed April 26, 1956, now abandoned, and S.N. 575,393, filed April 2, 1956, and now Patent No. 2,857,915.

*Field of invention*

Although many forms of catheters have a straight or untapered tubular form, a large proportion of catheters must have tapered portions in order to be usable for their intended purposes. For example, many catheters must have distal ends that taper down to a small tip. Similarly, with other catheters, it is necessary to form on the proximal end an outwardly tapering funnel which may be used as an adapter to attach the catheter to syringes or similar devices used to inject material into or drain fluids therefrom. Still other catheters must be formed with a tapering distal end and also a funnel shaped proximal end, i.e., so-called double tapered catheters.

Catheters must not only be made in a required shape or form, but they must also be sufficiently resistant to action of sterilizing agents and procedures that they may be properly sterilized before use. Moreover, not only must each catheter have the controlled critical size and shape demanded by its particular intended use, but it must also have very controlled wall thickness and composition so that it will have the right degree of flexibility at each point along its length to permit proper installation and functioning. These required properties of catheters have made it difficult to produce catheters having a satisfactory taper combined with the other required properties.

One generally used form of tapered catheter is made from a tube of fabric which is woven with the required tapers therein, after which coating and impregnating compositions are applied to the woven tube in order to form a fluid impermeable, non-absorptive structure. Although the weaving of the tapered tubes is a relatively expensive operation, they can be produced with a controlled wall thickness, and by careful application of the coating and impregnating agents, a final catheter can be produced in this fashion which has a controlled wall thickness throughout its length. In other words, it is not a new idea to make tapered catheters and several methods are known for producing this type of product. Another method of making tapered catheters is by the so-called "dipping process" in which a mold is dipped into a latex or plastisol bath and the coated mold is then baked to vulcanize or cure the coating to form the final molded article. Each of these methods, however, forms the catheter as a single unit, i.e., they cannot produce tapered catheters continuously in large numbers at high rates of speed.

Catheters of the straight tubular variety have been made in the past by the extrusion of thermoplastic materials from a tubular die. However, past attempts at the formation of tapered catheters using the plastic extrusion procedure, have been generally unsatisfactory because it has not been possible heretofore to maintain proper control of the shape of the tubing and the thickness of the wall so as to produce a tapered tube of the necessary critical size and flexibility.

*Objects*

A principal object of this invention is the provision of new methods for the production of tapered medico-surgical tubes, particularly catheters. Further objects include:

(1) The provision of new improvements in the extrusion of tapered catheters from thermoplastic material which make possible the production of catheters which have controlled wall thickness throughout their length, regardless of the change in diameter of the catheters along the length.

(2) The production of new forms of tapered catheters, including catheters of the double tapered variety, the single tapered variety, and the X-ray variety, which consist of a flexible thermoplastic material, and which have accurately controlled wall thickness throughout their length, regardless of the change in diameter of the catheter along the length.

(3) The provision of new methods for the production of tapered catheters and similar medico-surgical tubes which enable such products to be made continuously in larger numbers at high rates of speed and still possess accurate, controlled dimensions and flexibility.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

*General description*

These objects are accomplished according to the present invention through the production of tapered medico-surgical tubes by continuously extruding a tube of flexible plastic material from a tubular die, withdrawing the resulting tube away from said die at a controlled rate, varying said rate of withdrawal in cycles to produce periodic variations in the diameter of the tubing as extruded and introducing fluid under pressure into the bore of said tube to cooperate with said withdrawal rate variations to create tubing of controlled wall thickness with tapered sections therein of controlled length and at controlled spaced intervals. In the preferred methods, the amount of pressure upon the fluid introduced into the bore of the tube is varied in cycles in response to the cyclic changes in the rate of withdrawal, and a still further refinement involves the use of inverse proportional pressure variation whereby the pressure decreases in proportion to the increase in rate of withdrawal and the pressure increases in proportion to the decrease in rate of withdrawal.

A modification of the new methods of producing tapered catheters involves the extrusion of a continuous strip of X-ray opaque plastic material simultaneous with the extrusion of the plastic tube and the embedding of the X-ray opaque strip into the tube to give a combined tube and strip with smooth seamless outer surface in coordination with the rate of withdrawal change and related operations as just stated, thereby forming tapered catheters having an X-ray opaque line extending longitudinally along the entire length of the catheters. When the X-ray opaque strip is embedded at the point of formation of the tube per se, the width of the strip will vary approximately in proportion to the diameter of the catheter. This can be of use in conducting roentgenological inspections of a body inserted tube since the diameter of the tube at any point can be estimated and still the main body of the tube will be transparent to both X-rays and visible light, permitting visual inspection of its interior when removed from the body.

The success of the present invention is due to the discovery that medico-surgical tubes having a very high degree of control both as to dimensions and flexibility and containing no joints, seams or the like which can serve to harbor bacteria and other troublesome matter, can be produced by the new extrusion methods described above at high rates of speed, continuously and in large numbers, in contrast to the slow speed and discontinuous methods employed heretofore for making tapered catheters. Furthermore, the prior art methods have never permitted the wide range of control of flexibility which can be obtained in the tubes produced as described above because of the inherent limitations on materials which could be used in carrying out the prior art tapered tube forming operations.

*Detailed description*

A full understanding of the new methods for the production of tapered catheters of this invention and the method by which the objects listed above are accomplished may be had by reference to the accompanying drawings, in which:

Fig. 1 is a side view of a preferred embodiment of the catheter production apparatus of this invention;

Fig. 2 is an enlarged side view, partly in section, of the apparatus of Fig. 1, showing in detail the construction of the tubular extrusion die section and associated elements of the apparatus;

Fig. 3 is a sectional end view taken along the line 3—3 of Fig. 1;

Fig. 4 is a sectional end view taken along the line 4—4 of Fig. 2;

Fig. 5 is a sectional end view taken along the line 5—5 of Fig. 2;

Fig. 6 is an enlarged fragmentary side view showing in detail the construction of the braking means portion of the apparatus of Fig. 1;

Fig. 7 is a wiring diagram showing the electrical connections which operate the brake assembly and blowing gas pressure control valves of the apparatus of Fig. 1.

Fig. 8 is an enlarged cross-sectional view of an extrusion die used to form X-ray catheters, and Fig. 9 is an enlarged cross-sectional view of an X-ray catheter prepared by extrusion through a die of the type shown in Fig. 8 using the new methods described herein.

Referring in detail to the drawings, the new apparatus consists fundamentally of an extrusion section 2, a fluid pressure regulator section 4, a tube cooling section 6, a tube withdrawal section 8, and a braking section 10 which is employed in controlling the rate of withdrawal of an extruded tube formed in the extrusion section 2.

The extrusion unit 2 comprises a heated cylinder 12 through which molten thermoplastic material 14 is forced by the screw stuffer 16 past a strainer 18 and a torpedo 20 to a tubular extrusion die 22, which is fitted in the end of the extrusion nozzle 24 which is held upon the cylinder 12 by the bolts 26.

A fluid orifice 28 is centrally located in the extension 30 of the torpedo 20, which forms with the die 22 the tubular opening through which the thermoplastic material 14 is extruded in forming the catheter tube 32. This orifice 28 connects through a tubular passage 34 and nipple 36 to the pipe 38. In turn, pipe 38 leads to gas regulator section 4, which will be described later in more detail in connection with Fig. 7.

The tube cooling section 6 comprises a source of supply 40 of cooling fluid, a pipe or similar conduit 42 for directing cooling fluid from supply source 40 onto the extruded tube 32, and a valve 44 for controlling the rate of flow of the cooling fluid onto the extruded tube. The cooling section 6 also comprises a drain tray 46 held upon standards 48 and a drain outlet 50 for conveying used cooling fluid from the drain tray 46 by way of a pump (not shown) back to the supply source 40, or by gravity to the sewer (not shown).

The tube withdrawal section 8 comprises an endless belt 52 mounted on rollers 54 fixed upon the shaft 56, which is journaled in the vertical standard 58. The belt 52 passes over top of a supporting plate or table 60, and a pair of side members or guides 62 are fixed to the table 60 and supported at the sides of the belt 52 upon the standard 58.

The roller 54 is rotated through a sprocket 64, chain 66 and sprocket 68 by the combined electric motor and variable speed drive 70. The drive 70 is run in a direction so that the driven roller moves the belt 52 over the top of table 60 in a direction away from the tubular die 22.

Details of construction of the brake device 10 can be understood by reference to Figs. 1 and 6. This device 10 consists of a brake shoe or rocker dog 72 which is centrally pivoted upon a bolt 74 so that its lower end or braking surface 76 can be moved into and out of engagement with the upper surface of the belt 52. This brake shoe movement is accomplished by pivoting a linkage 78 to the upper end 80 of the brake shoe 72 by a bolt 82. In the opposite end of the linkage 78 there is provided a slot 84 which is slidably connected to the operating shaft 86 of the solenoid 88 by a set screw 90. The solenoid shaft 86 is normally pulled toward the lug 92 by a coil spring 94, but when the solenoid 88 is energized by electric current flowing through the wires 96 and 98, the shaft 86 is moved in the direction of the arrow shown in Fig. 6 to assume the position shown in dotted lines on Fig. 6 so as to engage the braking surface 76 with the upper surface of the belt 52. Then, as soon as energizing of the solenoid 88 is terminated by cutting off the electric current through wires 96 and 98, the coil spring 94 returns the shaft to the relaxed position shown in Fig. 6 so that a braking force by the brake shoe 72 is no longer applied to the belt 52.

The braking device 10 is operated so as to apply a braking force to the belt 52 which is coordinated with changes in the pressure of fluid applied to the orifice 28 through the tube 38. This coordination of control of braking means and gas supply means 4 is accomplished by an electrical system shown in Fig. 7.

The electric conductor 96 for the brake device 10 connects to a source of power (not shown) while the conductor 98 leads to contact 100 of the single pole double throw switch 102. This switch 102 also comprises a switch member 104 which is electrically connected through lead 106 to a source of power (not shown) and a second contact member 108. The solenoid valve 110 is electrically connected through lead 112 to one terminal of the power source, and to the other terminal of the power source through lead 114, which joins contact 108.

Solenoid valve 116 is electrically connected through conductor 118 to lead 96 and through conductor 120 to the electrical lead 98. Hence, when switch member 104 is moved to contact 100, both brake device 10 and valve 116 are energized while valve 110 is not energized. Conversely, when switch member 104 is moved to contact 108, device 10 and valve 116 are deenergized and valve 110 is energized.

In addition to solenoid valves 110 and 116, the fluid pressure regulating device 104 comprises a conduit 122 which leads to a source of gas or other fluid (not shown)

which is maintained under high pressure. Fluid entering conduit 122 passes through a gas regulator 124, by which the pressure of fluid coming from line 122 can be reduced to any desired lower value in well-known fashion before it enters fluid conduit 126.

Conduit 126 leads through the manual regulating valves 128 and 130 before it connects with the solenoid valve 110. A conduit 132 leads off from conduit 126 to solenoid valve 116 and there is a by-pass line 134 which connects conduit 126 on the downstream side of valve 128 to the conduit 38 so as to by-pass solenoid valve 116. The conduit 38 which leads from solenoid valve 116, and also joins to by-pass line 134, is connected as previously mentioned, with orifice 28, and fluid under pressure after passing through regulating device 4 enters the orifice 28 through the conduit 38.

Solenoid valve 110 has an outlet line 136 which exhausts to the atmosphere so that when valve 110 is opened, the pressure in line 126 downstream of valve 130 is reduced quickly to atmospheric pressure and the pressure in the system upstream of valve 130 is controlled by the relative settings of valve 128 and 130.

Although for the sake of clarity and understanding of this invention and its apparatus, valves 110 and 116 have been illustrated as independent solenoid valves, it will be clear from the description of operation of the new apparatus to be given below that valves 110 and 116 can be substituted by a duplex valve which operates to shut off flow of fluid through line 132 and open flow of fluid through line 126 to exhaust 136, or alternatively, to shut off flow of fluid to exhaust 136 when fluid flow through conduit 132 is started.

It will be understood that the switch means 102 may be substituted by equivalent switching devices of a double pole, double throw variety with suitable rearrangements of electric leads to solenoid valves 110 and 116, and to the solenoid 88 of brake device 10. Similarly, although it is possible to manually operate the switch 102 between contacts 100 and 108, it is preferable to employ an automatic time operating device (not shown) to control the operation of switch 102.

The production of tapered catheters of controlled wall thickness, according to this invention, using the apparatus described above, is accomplished as follows:

Molten thermoplastic material 14 is forced by the screw stuffer 16 past strainer 18 and torpedo 20 out the tubular die 22, continuously forming a tube 32 of thermoplastic material. As the continuous tube 32 immerges from die 22, cooling fluid, such as cold water, flows from source 40 through conduit 42 onto the tube 32, rapidly reducing the temperature of the thermoplastic material and changing it from a flowable or moldable consistency into an unmoldable state. At the same time, fluid under pressure, e.g., compressed air, flows from regulator 4 through conduit 38, out orifice 28, into the inside of tube 32. Since the material in tube 32 is still in flowable condition just as it immerges from die 22, pressure fluid from orifice 28 can cause the tube to expand to a diameter larger than that which is formed initially by the die 22.

Simultaneous with the blowing action of the pressure fluid from orifice 28, the shaping of tube 32, before it assumes an unmoldable condition through action of cooling fluid from line 42, is affected by the drawing action upon the tube created by axial movement of belt 32 away from die 22. Thus, if the pressure of fluid from orifice 28 is regulated so that there is neither expansion nor contraction in the diameter of the tube as it immerges from die 22, and the speed of movement of belt 52 is equivalent to the speed of extrusion of the tube 32 from die 22, then a continuous tube of the same diameter as die 22 will be formed. If now, gas pressure to orifice 28 is increased, the diameter of tube 32 will be caused to increase as it leaves die 22. Under these conditions, the speed of belt 52 is reduced so that sufficient thermoplastic material is supplied to create this larger diameter tube and still maintain the same wall thickness. Similarly, by releasing pressure on fluid passing through orifice 28, and increasing the speed of movement of belt 52, the diameter of tube 32 will return to that created by the die 22, and by increasing still further the speed of belt 52, it is possible to cause the tube to acquire a diameter somewhat smaller than that imparted by the die 22.

The change in pressure of fluid flowing to orifice 28 and part of the movement of belt 52 is effected by the electrical switching arrangement described in connection with Fig. 7. Thus, with switch member 104 thrown to contact 108, solenoid valve 110 is energized, while no current flows to valve 116 or device 10. Under these conditions, belt 52 will travel at the full speed created by the variable drive 70, while valve 110 will exhaust through line 136 to the atmosphere, causing the pressure in line 38 to be a minimum and to be controlled by manual regulation of valves 128 and 130. Thus, as can be seen, if valve 130 passes considerably more than valve 128, and with solenoid valve 116 closed, the pressure in line 38 will rapidly drop to atmospheric after opening valve 110 and closing valve 116, and any degree of reduced pressure between atmospheric and that supplied through gas regulator 124 can be obtained in switching from valve 116 to valve 110 by adjusting valve 128 relative to valve 130. Normally, valve 130 is set so that a minimum blowing pressure is maintained in line 38 even when valve 110 is open.

To form a taper in the tube 132, switch member 104 is thrown over to contact 100. This energizes solenoid 88 of speed control device 10 and solenoid valve 116. At the same time, valve 110 is closed so that the pressure builds up in line 38, while at the same time a braking action on belt 52 is applied by movement of brake shoe 72 to engage the upper surface of belt 52. This increased pressure in line 38 causes expansion in diameter of tube 32, leaving die 22 and a simultaneous slow-down in withdrawal of the tube from the die by withdrawal means 8 so that an outward taper in the tube results. Reversal of the procedure creates an inward taper.

Degrees of taper imparted in the tube can be regulated by the speed with which switch member 104 is thrown between contacts 100 and 108, by regulation of valves 128, 130, and gas regulator 124, so as to control the rate at which gas pressure builds up or decreases in conduit 38, by varying the speed of belt 52 through control of the variable drive 70, and by controlling the degree of braking force applied to belt 52 through the braking device 10, such as by regulation of the tension created by spring 94, the amount of current supplied to solenoid 88, or in other ways. For tapers of short length, it has been found most advantageous to hold the output speed of the drive 70 constant and to use the braking device 10 to completely stop the belt during the period valve 116 is opened and valve 110 is closed. Thus, the expansion of the tube under the resultant blowing action creates, with a short taper, a movement of plastic material away from die 22 even though the belt 52 is stopped for a brief period. Belt 52 is carried upon rollers 54 loosely enough to permit the belt to be completely stopped by brake shoe 72, even though drive 70 continues to turn when this type operation of the device is in progress.

Modifications of the apparatus and methods described in detail above can be used. Thus, although the apparatus shown in the attached drawings includes only one brake device 10 and a single pair of control valves 110 and 116, it will be understood that a plurality of each of these devices may be combined, if desired, to obtain any variety or desired arrangement of tapered sections in the catheters produced by the new methods. Another modification involves the formation of X-ray catheters described and claimed in copending application S.N. 575,393. This is accomplished by operating the tapering extrusion method as described above, but as the plastic tube is extruded from the extrusion die, a simultaneously extruded continuous strip of X-ray opaque plastic material is embedded in the tube so that the outer surface of the resulting striped tube is substantially smooth. This can be accomplished by the use of an extrusion machine having two separate screw-stuffers and a bi-orifice extrusion die of the type shown in Figure 8, the double screw extrusion machine being equipped with means for blowing air into the extruded tubing through a central opening 138 in the center of the die 140. The tubular die 140 has a major orifice 142 which is substantially ring-shaped in cross-section, formed between the inner wall 144 and the outer wall 146, and also a minor orifice 148 which is substantially circularly segmental in cross-section, formed by an arcuate wall portion 150 and a chordal wall portion 152 contiguous with the outer wall 146 of the major orifice 142.

In extruding the X-ray catheter 154, the plastic material to create the main tube 156 is extruded through the major orifice 142, while the X-ray opaque plastic material to form a longitudinal X-ray opaque line 158 on the catheter is extruded through the minor orifice 148.

The X-ray catheters are formed with tapered sections and controlled wall thickness by controlled varied rate of withdrawal and coordinated air blowing as described above. The X-ray tubing as it is withdrawn from the extrusion die can be immediately cut into proper lengths at the points of maximum and minimum taper, or a continuous length of tapered tubing can be produced from which catheters can subsequently be formed by a series of operations in which the continuous tubing is cut at points of maximum diameter and then cut at the points of minimum diameter, if open end catheters are desired, or heated at these points of minimum diameter so as to close the end of the tube and form a closed tip if a closed end catheter is required. Thereafter, any required inlet openings can be punched, drilled or melted into the catheter.

Conclusion

The new methods described above make possible the production of many forms of tapered catheters, all consisting of a non-fibrous, unitary, seamless tube of flexible plastic material having controlled wall thickness and flexibility throughout the tube length regardless of the diameter of the tube. The new methods are especially useful in making tapered catheters and other tapered medico-surgical tubes continuously at high rates of production and relatively low cost with greater control on the tube dimensions, flexibility and related properties than has been possible heretofore.

I claim:

1. A method for the production of tapered catheters which have substantially uniform wall thickness throughout their length regardless of diameter which comprises continuously extruding a tube of flexible plastic material from a tubular die, withdrawing the resulting tube away from said die at a controlled rate, introducing fluid under pressure into the bore of said tube, varying the amount of pressure upon said fluid in cycles as said extrusion of thermoplastic material proceeds to cause a varied expansion in diameter of the tubing as it leaves said die and varying said rates of withdrawal inversely to said fluid pressure change whereby the rate of withdrawal is reduced as said pressure increases and said rate increases as said pressure decreases.

2. A method for the production of tapered catheters which have substantially uniform wall thickness throughout their length regardless of diameter, which comprises continuously extruding horizontally from a tubular die a tube of flexible thermoplastic material across an air gap and onto a horizontal web which moves axially away from said die at a controlled rate, forcing gas under pressure into the tube at the point of formation of the tube, said tube being closed at some position remote from said point of formation whereby gas may be retained in the tube under pressure, varying the pressure upon said gas within the tube in cycles as the extrusion of the tube continues to cause a varied expansion in the diameter of the tubing as it leaves the point of formation and varying the speed of travel of said horizontal web inversely to said fluid pressure change so the rate of travel of the tubing supported thereon away from said point of formation is faster when said gas pressure is lower and is slower when said gas pressure is higher whereby a catheter of varying diameter with uniform wall thickness is produced.

3. A method for the production of tapered catheters which have substantially uniform wall thickness throughout their length regardless of diameter which comprises continuously forming at a fixed point a tube of flexible thermoplastic material from a molten mass of said material, withdrawing the tube as formed away from said point at a controlled rate with a positive withdrawal force, introducing fluid under pressure inside said tube at said point to create a positive expansion force upon the inside of said tube, varying in cycles the amount of pressure upon said fluid as the formation of said tube continues, and varying the speed of withdrawal of said tube in inverse proportion to said pressure variation whereby the tube is withdrawn from said point more rapidly when said pressure is low than when the pressure is high.

4. An extrusion method for the production of plastic tubes of controlled wall thickness throughout their length that have tapered sections therein spaced predetermined distances apart which comprises continuously extruding a tube of flexible plastic material from a tubular die directly into a zone permitting unconfined radial expansion of the tube while the plastic material in the tube as it emerges from the die is in a heated moldable condition, introducing fluid under pressure into the bore of said tube to subject the extruded tubing while in said heated moldable condition to a controlled internal expansive force, withdrawing the extruded tube away from said die at a controlled rate, varying said rate of withdrawal in cycles producing periodic variations in the tubing diameter, said fluid introduction being coordinated with said variations in withdrawal rate whereby the internal expansive force on the tubing decreases as the rate of withdrawal increases and said force increases as said rate decreases producing tubing of controlled wall thickness having tapered sections therein.

5. An extrusion method for the production of medico-surgical tubes of controlled wall thickness throughout their length that have tapered sections therein spaced predetermined distances apart which comprises continuously extruding a tube of flexible plastic material from a tubular die directly into an air gap where the heated moldable plastic in the extruded tube is unconfined for radial expansion, introducing fluid under pressure into the bore of said tube to subject the extruded tubing while in said heated moldable condition to a controlled internal expansive force, withdrawing the extruded tube away from said die at a controlled rate, varying said rate of withdrawal in cycles producing periodic variations in the tubing diameter, said fluid introduction being coordinated with said variations in withdrawal rate whereby the internal expansive force on the tubing decreases as the rate of withdrawal increases and said force increases as said rate decreases producing tubing of controlled wall thickness having tapered sections therein.

6. The method of making a tapered catheter whose position within living tissue into which it is inserted may be precisely determined by X-ray observation which consists in extruding flexible, water-proof, plastic material into a substantially tubular form, simultaneously extruding a continuous strip of plastic material having X-ray opaque pigment dispersed therein, embedding said strip in the tube of plastic material so that the outer surface of the tube is substantially smooth, introducing fluid under pressure into the bore of said tube to subject the extruded tubing to a controlled internal expansive force, withdrawing the extruded tube away from the point of formation at a controlled rate, varying said rate of withdrawal in cycles producing periodic variations in tubing diameter, said fluid introduction being coordinated with said variations in withdrawal rate whereby the internal expansive force on the tubing decreases as the rate of withdrawal increases and said force increases as said rate decreases producing tubing of controlled wall thickness having tapered sections and a longitudinally extending X-ray opaque line therein.

References Cited in the file of this patent

UNITED STATES PATENTS

| | | |
|---|---|---|
| 2,141,776 | Vautier et al. | Dec. 27, 1938 |
| 2,456,141 | Myerson | Dec. 14, 1948 |
| 2,461,976 | Schenk | Feb. 15, 1949 |
| 2,512,844 | Weber | June 27, 1950 |

FOREIGN PATENTS

| | | |
|---|---|---|
| 401,529 | Great Britain | Nov. 16, 1933 |